3,663,539
PROCESS FOR THE MANUFACTURE OF BASIC OXAZINE DYESTUFFS

Gustav Schafer and Norbert Ottawa, Frankfurt am Main, Germany, assignors to Farbwerke Hoechst Aktiengesellschaft vormals Meister Lucius & Bruning, Frankfurt am Main, Germany
No Drawing. Filed Feb. 13, 1969, Ser. No. 799,086
Int. Cl. C07d 87/50
U.S. Cl. 260—242
4 Claims

ABSTRACT OF THE DISCLOSURE

In the process for the manufacture of basic oxazine dyestuffs of the formula

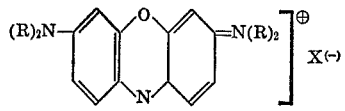

in which R represents an alkyl group from 1 to 4 carbon atoms and $X^{(-)}$ represents $Cl^-$ or $ZnCl_3^-$ by treating a dialkyl-m-aminophenol-alkyl ether, the alkyl groups herein containing from 1 to 4 carbon atoms, with nitrous acid and condensing the p-nitroso compound so obtained with a dialkyl-m-amino-phenol, the alkyl groups herein containing from 1 to 4 carbon atoms, the improvement which comprises condensing the suspension of the p-nitroso compound obtained as described above with the said dialkyl-m-amino-phenol without being intermediately isolated.

---

The present invention relates to a process for the manufacture of basic oxazine dyestuffs.

In the preparation of basic oxazine dyestuffs it is known that p-nitroso compounds of aromatic amines, such as nitroso-dimethylaniline or nitroso-diethyl-m-phenetidine, are condensed with m-amidophenols (cf. German Pats. Nos. 62,367 and 300,258). These known processes that are used still today on an industrial scale have the disadvantage that they are carried out in separate reaction steps: (1) Preparation of the nitroso compound from aromatic amines in an aqueous solution of mineral acids, (2) Isolation of the mineral-acid nitroso compound by suction-filtration and drying, and (3) Condensation of this compound with a m-amidophenol in an alcoholic solution, whereupon the nitroso compound must be added to the boiling m-amidophenol solution.

The poisonous nitroso compound can only be handled with care and precaution since it may cause considerable damage of the human skin. Therefore, the manufacture of the dyestuffs requires considerable expense of apparatus owing to the separate reaction steps and to the difficult handling of the poisonous chemical substances.

It has now been found that basic oxazine dyestuffs of the general Formula 1

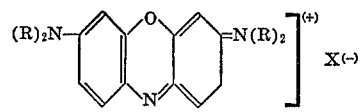

wherein R represents an alkyl group of from 1 to 4 carbon atoms, $X^{(-)}$ represents an anion, preferably a chlorine ion or a $ZnCl_3^-$-ion, can be prepared, without the cited difficulties, by treating a dialkyl-m-aminophenol alkyl ether (wherein the alkyl groups contain from 1 to 4 carbon atoms) with nitrous acid in an aqueous-alcoholic solution and condensing the suspension of the p-nitroso compound so obtained, without an intermediate isolation, with a dialkyl-m-aminophenol (wherein the alkyl groups contain from 1 to 4 carbon atoms).

When the process is carried out according to the invention, a filtration of the p-nitroso compound is not necessary and, thus, this compound has no injurious effect on health. The safety in handling can be increased by performing the further treatment (condensation) of the p-nitroso compound formed as an intermediate in a closed apparatus.

The condensation of the p-nitroso compound with the dialkyl-m-aminobenzene proceeds, as it is known from the above-cited patents, in an alcoholic solution. When the condensation is effected in water, slightly soluble products are obtained which have a very unsatisfactory tinctorial strength. It is, therefore, surprising that the use of an aqueous sodium nitrite solution and aqueous hydrochloric acid during the treatment with nitrous acid in alcohol has no troubling effect on the subsequent condensation and that the dyestuffs can be obtained in very good yield and purity. The treatment with nitrous acid and the condensation are suitably effected, as far as the alcoholic component is concerned, in a lower alkanol, preferably methanol or ethanol.

After the condensation, the dyestuff is suitably precipitated in the form of the zinc chloride double salt and may be separated by filtration in the form of this salt. It is, however, also possible to convert the zinc chloride double salt into the simple hydrochloride by a reaction with a calculated amount of ammonium carbonate or alkali metal carbonate and to isolate the dyestuff salt by evaporation of the solution, for example by spray-drying or drying on the cylinders. Compared with the zinc chloride double salt the hydrochloride is distinguished by a substantially better solubility which permits the dyestuff to be sold in the form of a concentrated solution.

The following example serves to illustrate the invention, but it is not intended to limit it thereto, the parts being by weight unless otherwise stated.

EXAMPLE 114 parts of an aqueous sodium nitrite solution (of 40% strength) were introduced at 0–3° C. into a solution of 125 parts of diethyl-m-amido-phenetidine in 150 parts of ethanol and 168 parts of 30%-hydrochloric acid. After stirring had been continued for 1 hour, the pH-value of the solution was adjusted to 2–4 by means of about 7.5 parts of sodium carbonate. The suspension obtained was added in small portions to a boiling solution of 100 parts of diethyl-m-amidophenol in 300 parts of ethanol. When the reaction was complete, the solution was cooled to 50° C. and 50 parts of zinc chloride were added while stirring. The solution was then allowed to cool to 20° C., the dyestuff was suction-filtered in the form of the zinc chloride double salt and washed with ethanol.

To convert the zinc chloride double salt of the dyestuff of the formula

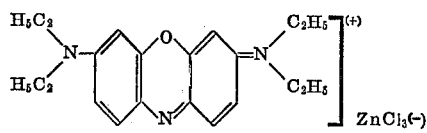

into the corresponding hydrochloride, the cake obtained by suction-filtration as disclosed above was suspended in 4,000 parts of water and at 60° C. such an amount of ammonium carbonate was added as was sufficient for a filtered sample, after further addition of ammonium carbonate, not to precipitate any more zinc carbonate. For this purpose, about 90 parts of ammonium carbonate were required. The solution was clarified at 60° C. and the dyestuff (hydrochloride) was isolated by spray-drying. A dyestuff powder was obtained which was about 30 times more soluble in 5%-acetic acid than the zinc chloride double salt.

We claim:

1. In a process for the manufacture of a basic oxazine dyestuff of the formula

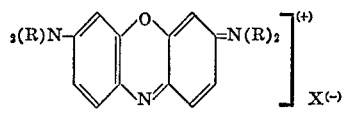

wherein R is an alkyl of 1 to 4 carbon atoms and X is Cl or $ZnCl_3$ by treating a dialkyl-m-aminophenol-alkyl ether, the alkyl groups of which are of 1 to 4 carbon atoms, with nitrous acid in an aqueous-alcoholic solution to form a p-nitroso reaction product, and condensing the p-nitroso reaction product with a dialkyl-m-aminophenol the alkyl groups of which are of 1 to 4 carbon atoms, the improvement which comprises condensing said p-nitroso reaction product and said aminophenol in said aqueous-alcoholic solution without intermediate isolation of said p-nitroso reaction product.

2. The improvement according to claim 1 wherein said solution is aqueous lower alkanol.

3. The improvement according to claim 1 wherein said solution is aqueous methanol or aqueous ethanol.

4. The improvement according to claim 1 wherein said aminophenol alkyl ether is diethyl-m-aminophenetidine and said aminophenol is diethyl-m-aminophenol.

References Cited
UNITED STATES PATENTS

| | | | |
|---|---|---|---|
| 257,498 | 5/1882 | Koechlin | 260—244 |
| 1,766,403 | 6/1930 | Schulemann et al. | 260—244 |
| 1,879,541 | 9/1932 | Schulemann et al. | 260—244 |
| 2,647,895 | 8/1953 | Crossley et al. | 260—244 |
| 2,677,684 | 5/1954 | Crossley et al. | 260—244 |

OTHER REFERENCES

Venkataraman: "Chemistry of Synthetic Dyes," vol. II, 1952, Academic Press, pp. 762 and 780–791.

HENRY R. JILES, Primary Examiner

R. T. BOND, Assistant Examiner

U.S. Cl. X.R.

260—244 R